(12) United States Patent
Ross

(10) Patent No.: US 10,619,434 B2
(45) Date of Patent: Apr. 14, 2020

(54) WET DRYER FOR DILUENT RECOVERY

(71) Applicant: RECOVER ENERGY SERVICES INC., Calgary (CA)

(72) Inventor: Stan Ross, Cochrane (CA)

(73) Assignee: RECOVER ENERGY SERVICES INC., Calgary, AB (CA)

( * ) Notice: Subject to any disclaimer, the term of this patent is extended or adjusted under 35 U.S.C. 154(b) by 9 days.

(21) Appl. No.: 15/986,243

(22) Filed: May 22, 2018

(65) Prior Publication Data

US 2018/0347299 A1    Dec. 6, 2018

Related U.S. Application Data

(60) Provisional application No. 62/513,722, filed on Jun. 1, 2007.

(51) Int. Cl.
| | | |
|---|---|---|
| E21B 21/06 | (2006.01) | |
| B01D 3/38 | (2006.01) | |
| B01D 12/00 | (2006.01) | |
| E21B 21/01 | (2006.01) | |
| B01D 1/00 | (2006.01) | |
| B01D 5/00 | (2006.01) | |
| E21B 21/00 | (2006.01) | |

(52) U.S. Cl.
CPC .......... *E21B 21/065* (2013.01); *B01D 1/0041* (2013.01); *B01D 3/38* (2013.01); *B01D 5/006* (2013.01); *B01D 12/00* (2013.01); *E21B 21/01* (2013.01); *E21B 21/066* (2013.01); *B01D 2202/00* (2013.01); *B01D 2221/04* (2013.01); *E21B 2021/007* (2013.01)

(58) Field of Classification Search
CPC .......... C02F 1/004; C02F 1/008; C02F 1/041; C02F 1/048; C02F 1/06; C02F 1/08; C02F 1/12; B01D 1/12; B01D 1/16; B01D 1/221; B01D 3/065; B01D 3/10; B01D 3/106; A01K 79/02
See application file for complete search history.

(56) References Cited

U.S. PATENT DOCUMENTS

| | | |
|---|---|---|
| 4,836,302 A | 6/1989 | Heilhecker et al. |
| 5,005,655 A | 4/1991 | Stokke et al. |
| 5,053,082 A | 10/1991 | Flanigan et al. |
| 5,080,721 A | 1/1992 | Flanigan et al. |
| 6,550,552 B1 | 4/2003 | Pappa et al. |
| 8,820,438 B2 | 9/2014 | Ross et al. |

(Continued)

OTHER PUBLICATIONS

U.S. Appl. No. 62/303,163 to Palmer et al., filed Mar. 3, 2016.

(Continued)

*Primary Examiner* — Brian A McCaig

(74) *Attorney, Agent, or Firm* — Greenblum & Bernstein, P.L.C.

(57) ABSTRACT

A process for removing volatile diluent(s) from processed solids, generated from unstabilized drilling waste being washed in a diluent/solvent wash process. The process describes the use of hot water to deliver quality heat energy to the processed solids phase, evaporating the diluent and at least partially removing chlorides or other soluble or insoluble contaminants in the process, resulting in enhanced efficiency of diluent and contaminant recovery, for example, as a result of the near infinite surface area of water, among other things.

24 Claims, 4 Drawing Sheets

(56) References Cited

U.S. PATENT DOCUMENTS

2005/0236015 A1* 10/2005 Goel ................... E21B 21/066
                                                    134/10
2016/0160612 A1*  6/2016 Kuznetz ............... E21B 41/005
                                                    166/250.01

OTHER PUBLICATIONS

U.S. Appl. No. 62/303,169 to Palmer et al., filed Mar. 3, 2016.
U.S. Appl. No. 62/416,952 to Palmer et al., filed Nov. 3, 2016.
U.S. Appl. No. 62/303,172 to Palmer et al., filed Mar. 3, 2016.

* cited by examiner

WET DRYER FOR DILUENT RECOVERY

CROSS-REFERENCE TO RELATED APPLICATION

This application is a non-provisional application claiming the benefit under 35 U.S.C. § 119(e) of U.S. Provisional Application No. 62/513,722 filed Jun. 1, 2017, the disclosure of which is expressly incorporated by reference herein in its entirety.

TECHNICAL FIELD

The field of art to which this invention generally pertains is the processing of drill cuttings waste or contaminated soils.

BACKGROUND

During the drilling of a well, gas or oil for example, drilling mud is typically pumped down the drill string through a drill bit. The drilling mud simultaneously cools the bit and carries drill cuttings up the well bore. Drilling mud is typically comprised of a fluid (or fluids), and mixture of additives which can be either fluids or solids, forming a useable drilling fluid. Oil base or brine base drilling fluids are often used to drill oil and gas wells because they have special characteristics that make them a better cooling/carrying fluid than other drilling muds. Additionally, such drilling muds may offer better wellbore stability and/or lubricity for the drill string in modem, horizontal wellbores.

Typically, the drill cuttings which are carried up the wellbore are subjected to solids separating devices when the cuttings exit the wellbore, such as that of shale shakers or decanter centrifuges. These mechanical separators allow a substantial portion of the drilling mud to be returned to the storage tanks for reuse, while the drill cuttings portion is sent to separate storage tanks. The drill cuttings still contain residual amounts of the drilling mud that couldn't be separated through mechanical means, and this residual drilling mud is considered to be contamination.

The drill cuttings are commonly known as drilling waste, because they serve no purpose after they have been removed from the wellbore. Thus, the contaminated drill cuttings are typically stabilized with a bulking agent, such as fly-ash, sawdust, or liquid absorbing pellets, to prevent residual free liquids from leaching from the solids during transport. The cuttings are then typically transported to a secure landfill where they are stored for an indeterminate period of time, typically generations.

With the evolution of new technologies such as thermal extraction, solvent/diluent washes, mechanical separators, and the increasing cost of drilling fluids, the ability to, and benefits of, reclaiming materials from the drill cuttings waste, such as various components of the drilling fluids, is increasing.

Accordingly, there is a constant search for new technologies and improvements to existing technologies to increase the efficiency and effectiveness of reclaiming processes.

BRIEF SUMMARY

A process for removing residual volatile diluent from processed solids containing a volatile diluent is describe, including introducing the processed solids phase containing volatile diluent liquids phase into the inlet of a tank containing at least one inlet, at least one outlet, and a hot water phase to cause the volatile diluent liquids phase to evaporate and exit the hot water phase whereupon the evaporated volatile diluent liquids phase is evacuated through the at least one outlet of the hot water tank and, evacuating the evaporated volatile diluent liquids phase through the at least one outlet located above the hot water phase of the hot water tank connected to a hermetically sealed conduit and condensing the evaporated volatile diluent liquids phase in an operatively connected condenser into at least one recovered condensed liquids phase and, recycling the recovered condensed liquids phase for reuse in at least one operatively connected gas tight diluent washing process and, evacuating the treated processed solids phase from the hot water tank and further dewatering the treated processed solids phase to remove at least a portion of the hot water phase resulting in a cleaned solids phase substantially lacking a volatile diluent phase, where the entire process is performed in a vapor-tight and liquid-tight environment, resulting in enhanced volatile diluent removal from a solids phase.

Additional embodiments include: the process described above where the water temperature is below the boiling temperature of water, corrected to zero gauge pressure; the process described above where the water temperature is greater than the boiling temperature of the volatile diluent, corrected to zero gauge pressure; the process described above where the volatile diluent comprises hexane; the process described above where the water temperature is greater than 50° C., corrected to zero gauge pressure; the process described above where the water temperature is greater than 60° C., corrected to zero gauge pressure; the process described above where the water temperature is greater than 70° C., corrected to zero gauge pressure; the process described above where the water temperature is greater than 80° C., corrected to zero gauge pressure; the process described above where the water temperature is greater than 90° C., corrected to zero gauge pressure; the process described above where the water temperature is less than 99° C., corrected to zero gauge pressure; the process described above where the water temperature is greater than the evaporation temperature of the volatile diluent, corrected to zero gauge pressure; the process described above where the evaporated volatile diluent liquids phase comprises substantially all evaporated volatile diluent liquids phase; the process described above where the evaporated volatile diluent liquids phase additionally contains water vapor; the process described above where the evaporated volatile diluent liquids phase has a boiling point of less than 99° C., corrected to zero gauge pressure; the process described above where the mixture of evaporated volatile diluent liquids phase and water vapor comprises an azeotrope having a boiling point of less than 99° C., corrected to zero gauge pressure; the process described above where the hot water tank is directly or indirectly heated with a process heater substantially powered by natural gas; the process described above where the hot water tank is directly or indirectly heated with a boiler substantially powered by natural gas; the process described above where the hot water tank is directly or indirectly heated with electric heaters; the process described above where the vapor-tight and liquid-tight environment contains an oxygen content of less than 10% by volume; the process described above where the processed solids are obtained from unstabilized drilling waste washed with volatile diluent; the process described above where the processed solids are obtained from hydrocarbon contaminated solid-soil mixtures washed with a volatile diluent; the process described above where the cleaned solids phase contains chlorides and is further treated to reduce the chlorides content in the cleaned solids phase; the process described above where the dewatering comprises processing the treated processed solids phase using one or more of a centrifuge, settling tank, and/or filter press; and the process described above where the ratio of the hot water phase volume to processed solids phase volume is about 1:2, 1:1, or 2:1.

A gas tight process for removing volatile diluent from a processed solids phase is also described including introducing the processed solids phase containing volatile diluent phase into a tank containing hot water phase causing the volatile diluent phase to evaporate and exit the hot water phase whereupon the volatile diluent phase can be evacuated from the hot water tank and condense into at least one liquids phase, and simultaneously evacuating the treated solids phase from the hot water tank and further washing the treated solids phase in an operatively connected process to further remove organic or inorganic solids from the treated cleaned solids phase contained therein.

Additional embodiments include: the method described above where the evaporation point of any evaporated volatile diluent is less than the temperature of the hot water phase in the hot water tank.

These, and additional embodiments, will be apparent from the following descriptions.

DETAILED DESCRIPTION

Figure 1:
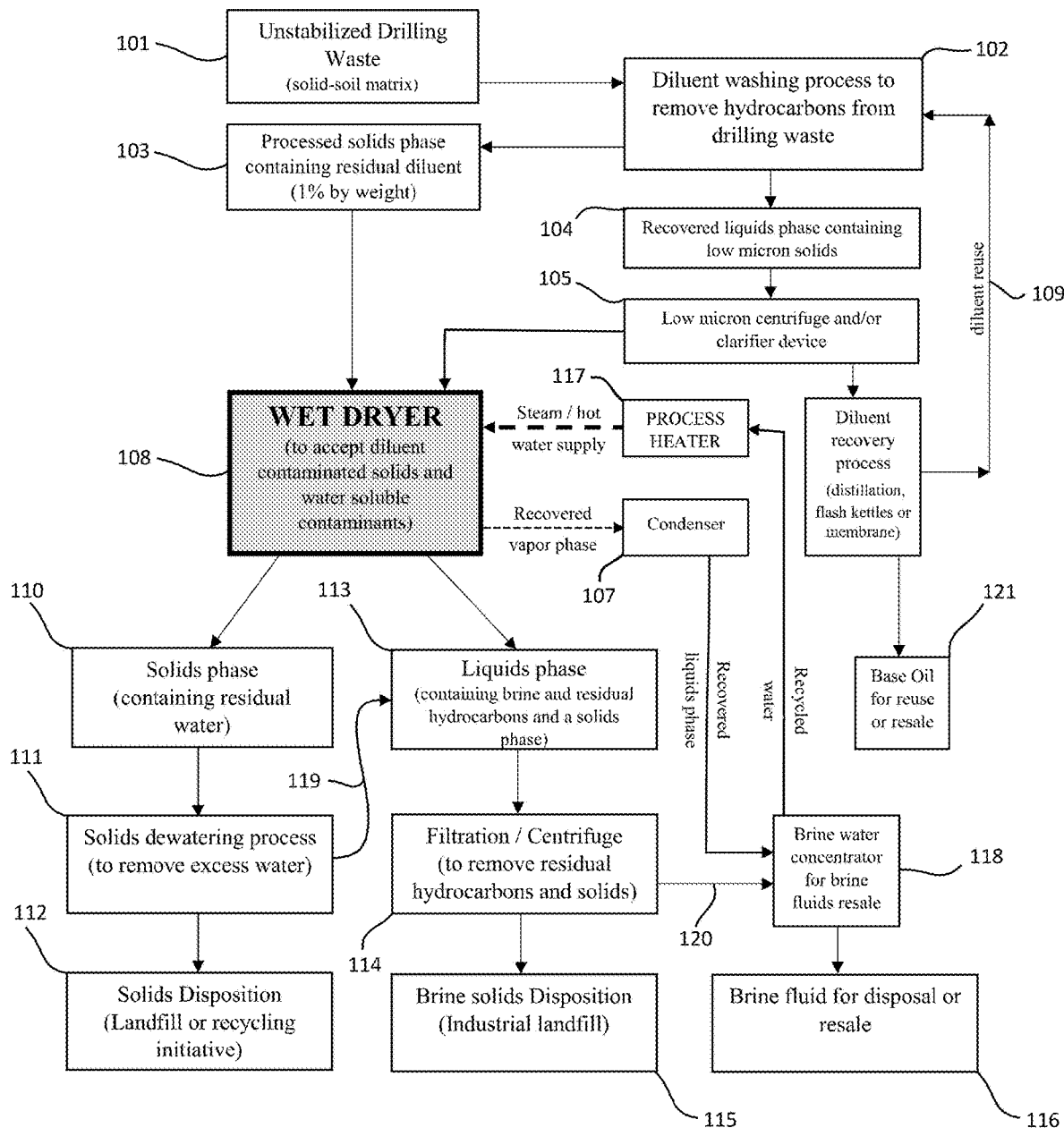
FIG. 1 is a representative flow chart illustrating an embodiment of a process described herein.

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those knowledgeable, how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those knowledgeable.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

The following terminology is included for ease of understanding:

Drilling fluid—used in the drilling industry to carry the drill cuttings/solids phase (rock, clay, shale, etc.) broken up by the drill bit out of the well bore. Drilling fluid (also known as drilling mud) consists of a base fluid with additives which can include liquids or solids or both, which give the drilling fluid properties necessary for effective use as a drilling mud.

Oil base mud—(OBM) also known as Invert, is a type of drilling fluid that uses oil as the base ingredient and typically consists of a mixture of oil, emulsified brine water and drilling mud additives which might be solids or liquids or both. As odd as it is, water is considered a solid in an oil base mud, not a liquid. OBM's typically consist of distillates or synthetic oil as the base fluid. Conversely, water base mud is a drilling fluid that uses water as the base ingredient, mixed with liquids or solids or both. Common types of water base muds are gel-chem mud systems, brine mud systems or polymer mud systems.

Solid-Soil Matrix is used to reference an earthen material that is contaminated with an undesired substance. Typically, contaminants have at least a moderate toxicity value and limitations of discharging the contaminant are managed according to local, state or federal regulations.

While the terms dewatering and dehydration typically mean the same thing, they have been used differently herein. Dewatering is intended to describe the removal of water while dehydration is intended to describe the removal of a liquid other than water for example, a diluent.

Normally, the terms diluent and solvent can be used interchangeably. Water is ineffective at removing oil base mud contamination and yet water is a solvent. For the purposes of this patent, a diluent is a flammable liquid used to dilute a soluble contaminant, thereby enabling removal of the contaminant from a solid-soil matrix. Those knowledgeable will recognize that while water is a solvent, it is not a diluent that is particularly useful in dissolving a hydrocarbon contaminant.

For purposes of general understanding herein, the Metric system has been used for consistent units of measurement, unless specifically cited as another, except for measurements in "Torr", which is not specific to either the Imperial or Metric systems Torr measurements are gauge pressure. The temperatures referenced herein are at zero Torr gauge (0 PSIG). If one desires to use pressures above or below zero Torr gauge (0 PSIG), one skilled in this art would know to adjust the temperatures accordingly, to obtain the similar and desired results described herein.

With a focus on environmental standards around the globe, efforts have been made to more effectively remediate waste streams or contaminated sites either quicker, or more effectively, or at a lower cost. One such example of a waste stream that is currently deposited into industrial landfills for long term storage is drilling waste. With the significant cost of drilling muds, there has been research and development to most effectively recover as much of the drilling mud as possible, by using solids separating devices or fluids rehabilitation devices. Such systems include shale shakers, centrifuges, centripetal dryers, thermal extraction systems or diluent washing systems.

U.S. Pat. Nos. 5,053,082 and 5,080,721 disclose the use of solvent to wash hydrocarbon contaminated drill cuttings. The resulting liquids phase is centrifuged to remove at least a portion of the low gravity solids phase. The resulting solids phase is sent to a heated auger for residual solvent extraction. Aside from the safety hazards of U.S. Pat. Nos. 5,053,083 and 5,080,721 neither of which incorporates the use of a gas tight, oxygen deficient atmosphere, the art uses a heated auger which can become ineffective as small grain solids coat the heating surface, thereby reducing the effectiveness of the heating surface. Further, the processed drill cuttings will still contain a measurable volume of chlorides, an environmentally toxic contaminant in even small quantities.

U.S. Pat. No. 6,550,552 discloses the use of solvent, for example hexane or ethyl acetate, to wash hydrocarbon contaminated drill cuttings. The liquids phase is centrifuged to remove at least a portion of the solids phase. The liquids phase is then treated in a fine film evaporator at atmospheric pressure, or less than atmospheric pressure which results in the solvent being recovered in the overheads and the boiler bottoms being recovered for reuse as a drilling fluid consisting of oil and clay. Aside from the safety hazards of U.S. Pat. No. 6,550,552 which doesn't incorporate a gas tight, oxygen deficient atmosphere, the recovered boiler bottoms will have a lessor value due to the fact that it is a mixture of oil and clay. Put simply, the presence of clay suggests at least a portion of drilled solids are present, which is viewed by the industry as the nemesis of high rates of drill penetration. The presence of clay will dictate a lower resale value for the oil. The resulting solids phase is dried before being returned to the environment, using commercial type equipment at a temperature of about 80° C., in order to remove the extraction solvent residues. As will be discussed below, this actually results in at least a portion of the contaminant being redeposited on the cleaned drill cuttings.

Commonly assigned U.S. Pat. No. 8,820,438 herein incorporated in its entirety by reference, discloses the process of mixing unstabilized drill cuttings and a miscible diluent within a series of wash tanks. The diluent dissolves the contaminant thereby removing the oil base drilling fluid while reverse contaminating the solids phase with the diluent. The liquids phase mixture is moved to one or more fluids rehabilitation processes where finally the diluent is evaporated, condensed and reused in the wash process, and the oil phase is reused as a drilling fluid base. The processed solids phase is then dried and the residual diluent is evaporated, condensed and reused in the wash process. While the process described does incorporate a gas tight oxygen deficient environment, the art uses a heated auger which can become ineffective as small grain solids coat the heating surface, thereby reducing the effectiveness of the heating surface. Further, the processed drill cuttings will still contain a measurable volume of chlorides, an environmentally toxic contaminant in even small quantities. The presence of chlorides removes the possibility of recycling or reusing the processed solids phase in many regulatory jurisdictions.

Commonly assigned co-pending U.S. Patent Application Ser. Nos. 62/303,163, 62/303,169, 62/303,172 and 62/416,952 herein incorporated in their entirety by reference, discloses a method of mixing a miscible diluent with unstabilized drill cuttings to allow the diluent to dissolve in the contaminant, thereby altering the rheology of the hydrocarbon contaminant. The washing mechanism permits additional solid phase—liquid phase interaction moments as the solids phase and liquids phase are separated. The liquid phase mixture is moved to one or more fluids rehabilitation processes where the diluent is evaporated, condensed and reused in the wash process, and the oil phase is reused as a drilling fluid base. The processed solids phase mixture is moved to an operatively connected process for residual diluents extraction, for example, a solids dryer. Again, the use of a heated auger will cause small grain solids to coat the heating surface, thereby reducing the effectiveness of the heating surface. Like other art described above, these patents do not disclose a method to remove environmentally toxic chlorides, which substantially removes the possibility of recycling or reusing the processed solids phase.

Chlorides contamination is a direct result of removing the hydrocarbon contamination from unstabilized drill cuttings. In order to prepare an oil base mud, chlorides are dissolved in water to create a brine fluid, which is then emulsified into base oil (among other additives) to create oil base mud drilling fluid. The use of diluents (also known as solvents) like hexane for example, to dissolve the hydrocarbon phase exposes the 'cleaned' drilling waste to the brine water phase. Oil base muds are used because they generally aren't absorbed into hydrophilic (water loving) clays. However, when hexane substantially removes the hydrocarbon phase, the clays become susceptible to the brine water phase which is not simultaneously dissolved into the washing diluent(s). The brine water phase is then available to attack the hydrophilic clay and when the 'cleaned' drilling waste is dried in a solids dryer (to remove residual moisture), the chlorides are left behind, re-contaminating the 'cleaned' drilling waste with another form of contamination. This is similarly true when Low Temp Thermal processors are used to remove liquids phase contamination from oil base drilling mud. The water and hydrocarbons are vaporized in the reactor leaving additives, specifically chlorides to contaminate the 'cleaned' drilling waste.

Commonly assigned co-pending U.S. Patent Application Ser. Nos. 62/415,156 and 62/212,754 herein incorporated in their entirety by reference, discloses separating a liquids phase from lower gravity solids phase by exploiting the advantages gained by altering the rheology of the liquids phase after a solids-soil matrix washing process has been employed. Thereafter, the low gravity solids are sent to an operatively connected process for residual diluent extraction, for example, a solids dryer. As mentioned in the commonly assigned, co-pending patent applications cited above, recycling or reusing processed solids containing chlorides is extremely limited, if not completely restricted.

As referenced in the commonly assigned, co-pending patent applications cited above, the solids are dried for residual diluent removal. Any process utilizing a volatile diluent to wash contaminants from a solid-soil matrix, requires that residual volatile diluent be removed to ensure the solids phase is not discharged to the environment, or a final disposition (which can include a landfill or recycling method), with a low closed cup flash point, for example less than 60° C., either due to cost of diluent loss, worker safety, or regulatory compliance in some regulatory jurisdictions.

In most all solids dryer designs, the solids phase enters the first end of the dryer and moves through the drying process by means of a conveyor. As the solids phase is moved it is exposed to either air or a heating surface to facilitate the heat transfer necessary for liquids phase vaporization. The vapor typically exits through an opening in the vapor dome and moves through a heat exchanger so that the vapor is cooled and liquids condense. The dry processed solids phase is permitted to exit the opposite end of the dryer.

A solids dryer typically employs a heating surface or hot air to facilitate the heat transfer necessary for diluent evaporation. In the case of a heating surface, small granular solids which become stuck to the heating surface can cause a loss of efficiency. Using hot air can be highly ineffective unless there is a vast surface area available. Given the inability of the hot air to permeate the solids and evaporate underlying diluent, the solids must be mechanically contorted so that underlying diluent is exposed to the hot air, where it can be carried out of the drying process and recovered. Rotating components (for example, an auger conveyor) means there are mechanical components in the design which could become prone to mechanical fracture, thereby potentially introducing a spark to the process. Therefore, removal of residual volatile diluent must be conducted within a gas tight, oxygen deficient environment to mitigate the possibility of a fire or explosion.

As described in the commonly assigned, co-pending patent applications cited above, solids dryers are designed to remove residual diluent from a solid-soils matrix. Most solid-soil matrix wash systems work by diluting the contaminant to a point where the contamination is minute. However, if the wash fluid (in most cases, a volatile diluent) contains residual contamination, any portion of the contaminant present in the residual diluent will be redeposited upon the solid-soil matrix when the processed solids phase is moved to the solids dryer. Table 1 demonstrates an estimation of volumes of common constituents, as they move through a typical diluent wash process, resulting in at least a portion of the drilling fluid contaminants being redeposited on the processed solids phase, during the drying process.

TABLE 1

| 1000 litres of unstabilized drilling waste processed by a diluent (solvent) wash and thereafter dried in a solids dryer [volume is measured in litres] | | | |
|---|---|---|---|
| | Solids portion | Oil portion | Diluent portion |
| Pre-wash constituents | 700 | 300 | |
| Pre-wash contamination | | 30% (by volume) | |
| Wash constituents | 700 | 300 | 1000 |

TABLE 1-continued

| 1000 litres of unstabilized drilling waste processed by a diluent (solvent) wash and thereafter dried in a solids dryer [volume is measured in litres] | | | |
|---|---|---|---|
| | Solids portion | Oil portion | Diluent portion |
| Separation of the liquids phase and solids phase by mechanical or centripetal force | | | |
| Pre-dry constituents | 700 | 21 | 49 |
| Evaporation of volatile constituents in a solids dryer | | | |
| Evaporated constituents | | | 49 |
| Post-dry constituents (from the dryer) | 700 | 21 | |
| Post-dry contamination | | 3% (by volume) | |

U.S. Pat. Nos. 4,836,302 and 5,005,655 disclose the use of a volatile HCFC (hydrochlorofluorocarbons) solvent to wash hydrocarbon contaminated drill cuttings. The drilling waste is first subjected to turbulent mixing which leaves the surface of the cuttings substantially free of oil; the cuttings are then washed with HCFC solvent to remove the remaining hydrocarbons. The processed drilling waste is then sent to a heated sea water (salt water) tank where volatile constituents are evaporated and the solids phase is then discharged to sea. This technology was thought to be well suited for off shore drilling, not only for the aforementioned reason (disposal at sea) but also, it is known to those skilled in the art to use cooler sea water as a condensing fluid to cool the solvent vapors and thus recapture the solvent for reuse. However, known processes employ the use of HCFC solvents which are substantially banned from use in developed nations because HCFC's are a known ozone depleting substance. Essentially, U.S. Pat. Nos. 4,836,302 and 5,005,655 became obsolete because of the phase-out of HCFC's, before the term of the patent(s) expired.

The aforementioned patent (U.S. Pat. Nos. 4,836,302 and 5,005,655) disclose the discharge of chlorides laden solids overboard on an offshore drilling platform which is generally not an environmental concern because oceans (or connected seas) naturally contain chlorides. However, with respect to a land-based approach utilizing the aforementioned patents, the processed drill cuttings will still contain a measurable volume of chlorides and would thus need to be managed in an appropriate manner. The improper management of drilling waste containing chlorides can eventually cause environmental problems for example, chloride contamination of shallow groundwater or drinking water aquifers, and leaving chloride contaminated soils unusable. The industry accepted practice to manage chloride contaminated drilling waste is to deposit the waste in landfills which have protective liners, which can capture the leachate from all waste streams and treat it or send to downhole disposal wells.

To employ a method of post-wash diluent removal wherein hydrocarbon contaminants are substantially unable to be redeposited on the processed waste, or where additional contaminants could be removed during the residual diluent removal process, would be extremely advantageous to remediation efforts or recycling and reuse initiatives. It is therefore an object of the present invention to provide a method for diluent removal without redepositing other contaminants on the solid-soil matrix.

As described herein, is an improved method of using a hot water bath or a combination of steam in a hot water bath to deliver heat energy to a processed solids phase which has been washed with a volatile diluent, to remove residual contaminated diluent, organics or inorganics dissolved in the diluent, and water soluble contaminants. While the art described herein references solids contaminated with naturally occurring salts, or oil base drilling fluid (which contain measurable chlorides), the embodiments described herein can be used to remove residual volatile diluent used to wash any solid-soil matrix.

FIG. 1 is a flow chart which illustrates that a contaminated solid-soil mixture (101) is received and loaded into the diluent washing process (102). As mentioned in the commonly assigned documents cited above, the use of an otherwise flammable-volatile diluent (109) to wash contaminants by diluting the contaminant, requires that the process be contained within a gas tight, inert (oxygen deficient) atmosphere. It is recognized that a wash process (102) can include centripetal separators such as vertical cuttings dryers or horizontal decanters, or inclined wash tanks or vibratory shakers, or any method which provides sufficient contact between the diluent and the solid-soil matrix. In addition to the mechanics of the wash process (102), a washing process includes a dehydration step of the recovered liquids phase (104) to ensure only residual amounts of contaminated diluent remain, prior to the dehydrated processed solids phase (105) undergoing final diluent removal (described below). The processed solids phase (103) containing residual diluent (and therefore diluent-soluble contaminants) is next sent to the hot water bath (108) hereinafter referred to as the 'Wet Dryer' for residual diluent removal, or additional diluent-soluble contaminant(s) removal. Additionally (or for example), the art will illustrate that this is an opportunity to at least partially reduce chlorides contamination in the processed solids phase (103).

Following the Wet Dryer, the cleaned solids phase containing residual water or water soluble contaminants (110) is sent for dewatering (111) and disposition (112), while the liquids phase containing brine water, hydrocarbon droplets, among other possible soluble or insoluble contaminants (113), is sent to a filtration bank (114) where extracted toxic solids can be sent for suitable disposition (115) and the liquids phase (120) is sent to the brine concentrator (118). The brine concentrator is employed to recover a portion of the water from the filtration bank (114) and/or condenser (107) and recycle it back to the process heater (117) where it is heated to become hot water or steam, and reused in the Wet Dryer. Concentrated brine water (116) can be sent for disposal, or repurposed if possible. The recovered base oil from the diluent washing process (121) is sold or repurposed in an oil base mud.

As illustrated in the table that follows, the use hot water is clearly advantageous to remove diluent from a diluent laden solid-soil matrix when compared to using hot air or a thermal fluid solids dryer for two reasons. First, Table 2 shows that water has a higher specific heat capacity (Cp) than air.

TABLE 2

Specific Heat Capacity of Liquids vs Gases

| Water | Air |
|---|---|
| Cp WATER ≈ 4.18 kJ/kg ° C. | Cp AIR ≈ 1.00 kJ/kg ° C. |
| It takes 4.18 kJ (kiloJoule) of energy to raise the temperature of 1 kg (kilogram) of water by 1° C. | It takes 1.00 kJ of energy to raise the temperature of 1 kg of air by 1° C. |

For a constant mass system, and a fixed temperature change, the embodiment offers the ability to transfer more than four times more energy into water than air. Conversely, the embodiment can extract four times more energy from the water when used to liberate the solids phase of residual volatile diluent. Simply put, water has more 'thermal mass' than air.

Second, liquids are (molecularly) more densely packed than gases at atmospheric temperature and pressure. The mass density (p) of a liquid is approximately one thousand times greater than that of a gas.

TABLE 3

Mass Density of Liquids vs Gases

| Water | Air |
|---|---|
| ρ WATER ≈ 1000 kg/m$^3$ | ρ AIR ≈ 1.2 kg/m$^3$ |

Simply put, a fixed volume of water has a greater 'mass density' than does the same volume of air.

Combining the effect of higher heat capacity and denser fluid, hot water contains approximately four thousand times more usable energy than does an air dryer or thermal mechanical solids dryer, assuming a constant volume. Thus, the higher heat content can be used to remove diluent from a processed solids phase containing residual diluent, quicker than using air or thermal mechanical energy as the heat transfer mechanism.

The Wet Dryer is a hermetically sealed liquid-tight—vapor-tight heating tank operated nearer atmospheric pressure, wherein the processed solids phase is exposed to a hot water bath which is greater than the boiling temperature of the diluent, but generally less than 100° C., so to minimize water vaporization, thus minimizing the energy requirements during operation. Vaporization of the water phase (boiling) will cause the process equipment to require larger line sizes or larger condenser sizing, or larger heating systems. Evaporation of the water phase also increases the residual contaminant (for example chlorides) concentration proportionally in the hot water left behind, thus reducing the concentration driving gradient for further contaminant dissolution. The solids washing effect of the water lessens as the volume of water present is reduced. The hermetically sealed inlets and outlets for solids, liquids, vapor (or combinations thereof), prevent the ingress of oxygen containing air and the escape of volatile vapor from the process, by means of hermetically sealed conduits. The supply of heat energy used in the Wet Dryer can be supplied by a process heater, which is typically powered by less expensive natural gas. However, it should be recognized that electric heat, or steam from a boiler for example, can also be used to deliver the heat energy required to facilitate diluent evaporation.

When a process heater is used for heat energy, heat transfer fluid from the process heater is pumped to the Wet Dryer through heat tubes within the Wet Dryer, or within a heating jacket along the outside of the Wet Dryer. Optionally, the water from the Wet Dryer can be pumped to the process heater or an interconnected heat exchanger, wherein the water phase is heated to a temperature sufficient to maintain the desired water temperature during continuous Wet Dryer operation. Any means of introducing heat energy wherein at least a portion of the heat energy is absorbed into the water is acceptable. The hot water further transfers heat from the water to the volatile diluent or other undesired volatiles, which leave the heating tank through a hermetically sealed conduit as a vapor to an operatively connected condenser. Table 4 illustrates the specific heat of water, hexane and drill cuttings/solids phase (rock, clay, shale, etc.).

TABLE 4

Specific Heat of the target constituents

| | |
|---|---|
| Water | 4.18 kJ/kg ° C. |
| Hexane | 2.3 kJ/kg ° C. |
| Drill cuttings/solids phase | ~1.5 kJ/kg ° C. |

As shown, both drill cuttings/solids phase (~1.5 J/g° C.) and hexane (2.3 J/g° C.) have a lower specific heat than water (4.2 J/g° C.) meaning, each will absorb heat energy from the water phase, allowing the hexane to readily evaporate from the surface of the solids, or from within the solids particles (if the hexane has been absorbed into the solids phase).

While steam or a heat transfer fluid would provide an excellent means of controlling the water temperature, the design of the Wet Dryer is of less concern to the embodiment, other than to ensure the Wet Dryer design has a sufficient capability of both maintaining the water temperature and replenishing heat energy which is extracted from the hot water, as volatile vapor leaves the heating tank. This balance must be maintained with direct consideration of the drill cuttings feed throughput. For example, a cubic meter (m$^3$) of processed solids phase containing less than 10% (by volume) residual hexane will require approximately 240,000 BTU's (British Thermal Units) of heat energy to heat the processed solids phase from approximately 0° C. to a temperature sufficient to evaporate the hexane phase.

As an added benefit of the embodiments described herein, consider that approximately 60,000 BTU's of heat energy would need to be extracted from the greater hot water phase to reduce the temperature of one cube of water from a proposed Wet Dryer operating temperature of 85° C. down to 70° C. As such, while the Wet Dryer would require 240,000 BTU's of heat energy (per cubic meter of processed solids phase) to continually operate, the Wet Dryer itself would have a significant heat energy contingency stored in the greater hot water phase. In an effort to make the Wet Dryer as efficient as possible, the embodiment (and where practical, operatively connected processes), should be insulated to contain as much heat energy as is reasonably practical.

Figure 2:
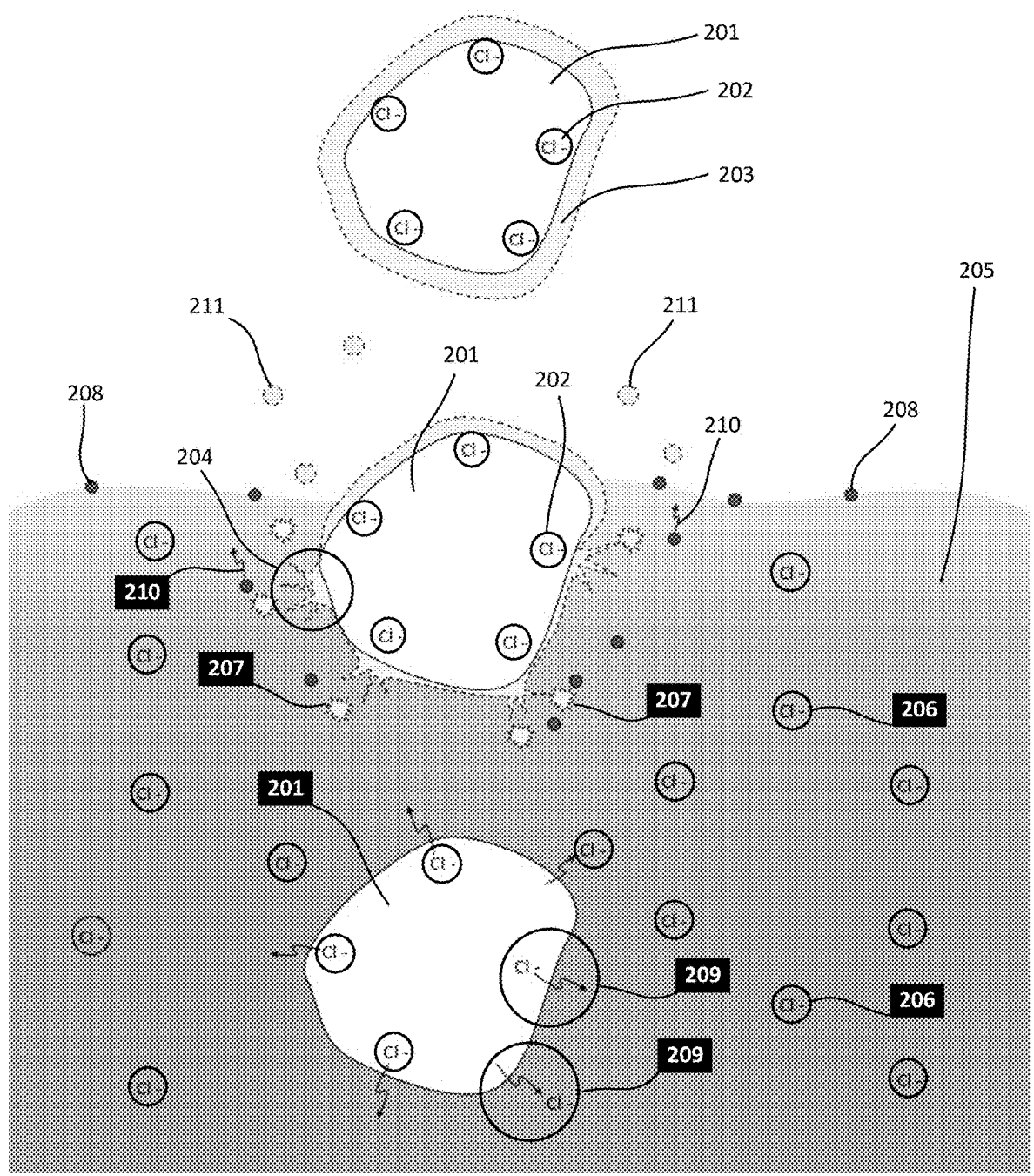
FIG. 2 is an illustration of a solids particle contaminated with a volatile diluent, residual oil base mud, and at least one common constituent of oil base mud, as it drops from above, into, and submerged in the hot water tank.

FIG. 2 is an illustration showing the transition of a processed solids phase (201, 202, 203) after being washed in a volatile diluent. The solids particle (201) contains chloride ions (202), which were deposited on the solids particle during the diluent wash process, and at least a measurable volume of volatile diluent, for example hexane, and trace amounts of the hydrocarbon phase of oil base mud dissolved in the diluent (203). The figure further illustrates the vaporization of the diluent (204) as it enters the greater hot water phase (205) which also contains free chloride ions (206). As the processed solids phase (201, 202, 203) is exposed to the greater hot water phase (205), the hexane diluent violently boils into a vapor phase (207), allowing the trace amounts of the hydrocarbon phase of oil base mud which was dissolved in the diluent (208) to become liberated and therefore floats upward (210) to the top of the hot water phase where the hydrocarbon droplets (208) can be skimmed for recovery. The hexane diluent vapor travels upward through the greater hot water phase (205) into the gas tight atmosphere of the Wet Dryer where the hexane diluent gas (211) can be extracted and recovered. Finally, the figure illustrates that the chloride ion contamination (202) which was contaminating the solids particle (post diluent washing) begins to at least partially diffuse into the greater hot water phase (205). A diffusion of the chlorides ions from the solids particle to the greater hot water phase (209) is only possible if the greater hot water phase contains a lessor chlorides value than the chlorides contamination of the solids particle. Thus, the greater hot water phase in the Wet Dryer must be continually replenished with fresh uncontaminated water.

The design and orientation of the Wet Dryer is of less concern to the embodiment because there are many possible design configurations which may include narrower or longer or wider or shorter tank designs. That said, FIGS. 3 and 4 illustrate exemplary machines capable of removing volatile diluents and other contaminants (for example chlorides) to provide a dynamic visualization of the mechanics of the process.

Figure 3:
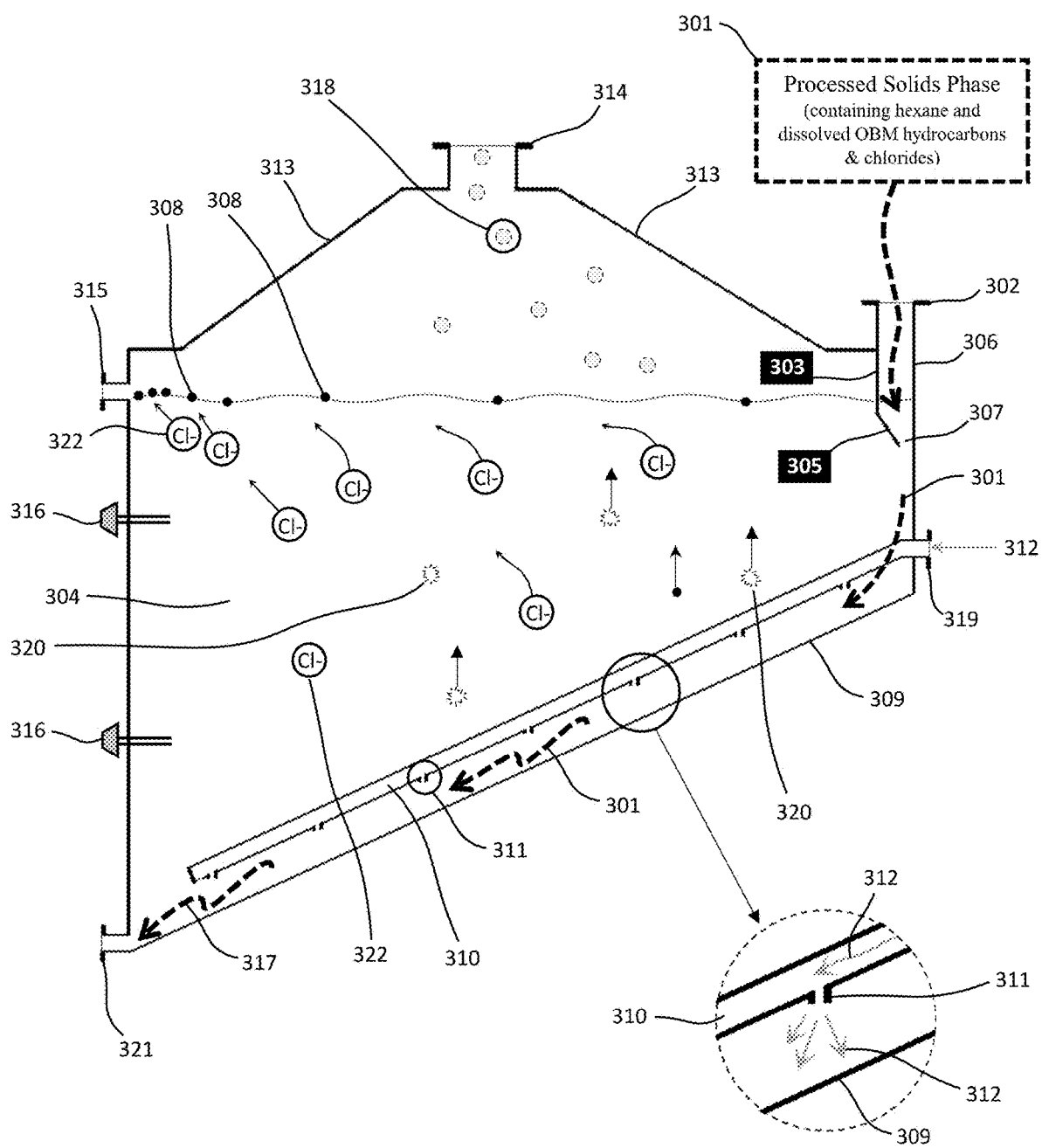
FIG. 3 is an illustration of a representative embodiment of a design configuration of a wet dryer described herein.
Figure 4:
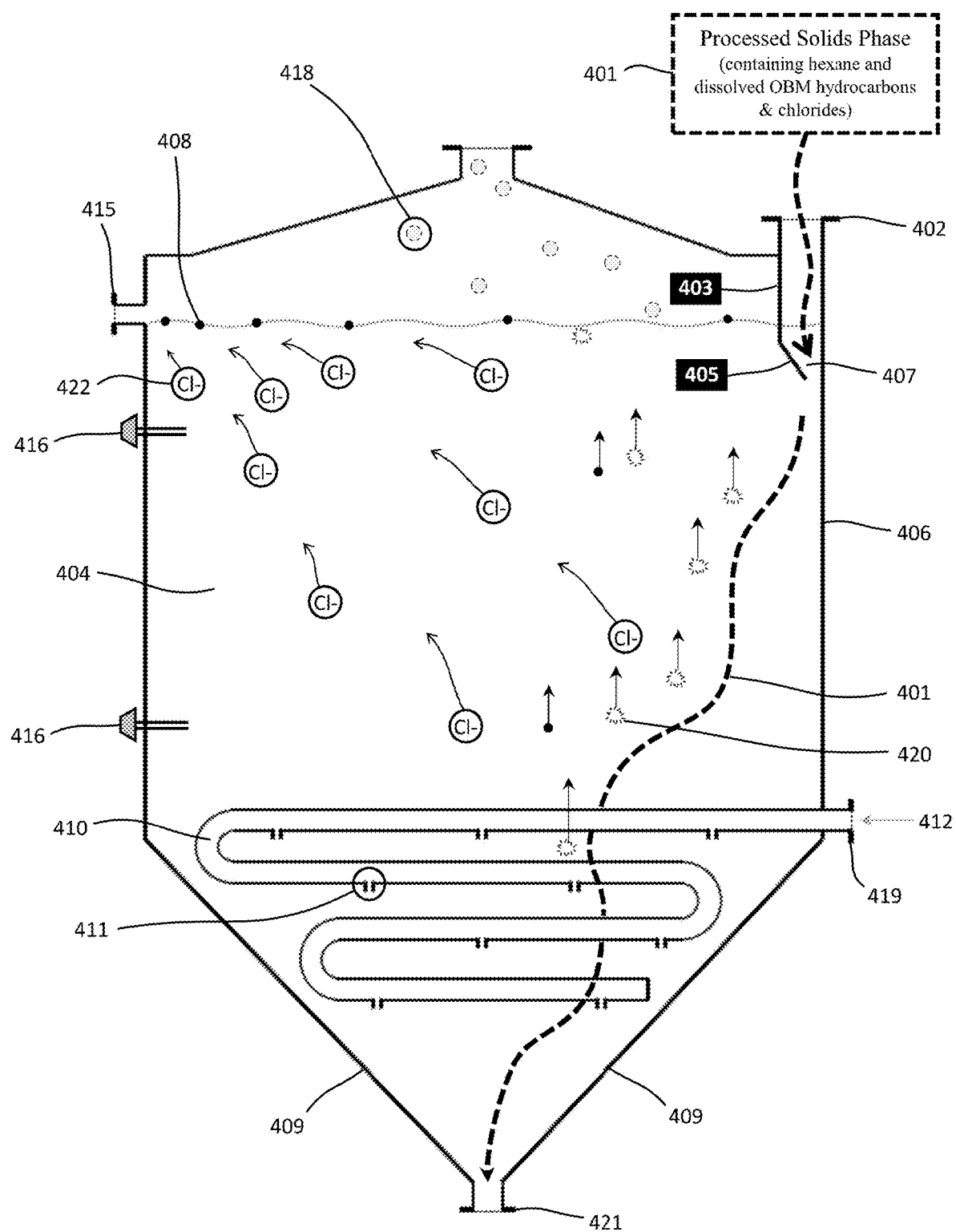
FIG. 4 is a representative embodiment illustrating a second design configuration of a wet dryer described herein.

FIG. 3 is a demonstration of a configuration for the Wet Dryer, which allows the processed solids phase (301) to enter the hermetically sealed Wet Dryer through a flanged inlet (302). The inlet includes a baffle (303) which substantially prevents vaporizing diluent (320) or liberated hydrocarbon droplets (308) from coining in contact with the processed solids phase (301) as it enters the hot water phase (304). The baffle (303) is also intended to bend (305) towards the Wet Dryer tank wall (306) to cause a pinch-point (307) as the solids enter the greater hot water phase (304). The pinch-point is unlikely to plug, provided the opening of the pinch-point is at least three times larger than the largest expected particle size in the solids phase. Given the process is intended to operate on a continual basis, the continuous influx of processed solids phase (301) will cool the hot water phase above the pinch-point area (307) and substantially prevent vaporization of the diluent (320), and therefore preventing the gaseous diluent (318) from exiting the flanged processed solids phase inlet (302) and moving back through the diluent washing process (not illustrated).

As the processed solids phase (301) enters the greater hot water phase (304), the solids phase will come to settle along the tank floor (309) where a constant supply of heat energy is delivered to the Wet Dryer. For illustrative purposes, a delivery tube (310) is shown along the lower section of the Wet Dryer, just above the tank floor (309). The constant supply of steam or hot water (312) is delivered from the process heater (not illustrated) into a flanged inlet (319) of the delivery tube (310). The steam or hot water is forced to leave the delivery tube through nozzles or outlets (311) which are spaced intermittently along the length of the delivery tube (310). This configuration of nozzles (311) would permit the supply of heat energy to directly contact the processed solids phase (301) enabling quality heat to vaporize the diluent (320) and further liberate the hydrocarbon droplets (308). The supply of hot water or steam allows four process metrics to continuously function:

a) The heat energy continually replaces heat energy lost in the operation of the Wet Dryer, as the diluent vaporizes and leaves the gas tight vapor dome (313) via a flanged vapor outlet (314), where it is cooled in an operatively connected hermetically sealed condenser (not illustrated); and, b) The inflow of clean hot water or steam which is lacking chlorides contamination causes the greater hot water volume to continuously move towards and overflow a weir or flanged liquids outlet (315) where the chlorides (322) contaminated liquids phase is conveyed to the liquids remediation processes (114); and, c) The inflow of clean hot water or steam causes the hydrocarbon droplets (308) floating along the top of the greater hot water phase (which have been liberated during the vaporization of the diluent) continually move by tidal-current to the overflow weir or flanged outlet (315); and, d) The inflow of steam or hot water can aid the solids phase in moving (317) along the sloped tank floor (309) where the cleaned solids phase (317) exits the wet dryer through a flanged slurry outlet (321).

The temperature of the hot water phase in the Wet Dryer is continually monitored by means of temperature probes (316) which are placed nearer the top and bottom of the greater hot water phase, and the injection of hot water or steam can be adjusted accordingly to increase, maintain or lower the greater hot water phase temperature.

A positive displacement pump (not illustrated) is connected to the flanged slurry outlet (321). A positive displacement pump is most practical for slurry movement because of the ability for it a to handle high solids loading, generally they have a low net positive suction head when compared to centrifugal pumps, and positive displacement pump designs simultaneously meters the flow. The positive displacement pump delivers the cleaned solids phase slurry to a dewatering process (111). Those knowledgeable will recognize that the process of dewatering can be accomplished using many commercially available processes for example, a centrifuge (not illustrated) or settling tank (not illustrated) or filter press (not illustrated), all of which are commercially available processes.

Like FIG. 3, FIG. 4 is a demonstration of a configuration for the Wet Dryer. Again, the processed solids phase (401) enters the hermetically sealed Wet Dryer through a flanged inlet (402). The inlet includes a baffle (403) which substantially prevents vaporizing diluent or liberated hydrocarbon droplets from coining in contact with the processed solids phase (401) as it enters the greater hot water phase (404). The baffle (403) is also intended to bend (405) towards the Wet Dryer tank wall (406) to cause a pinch point (407) as the processed solids phase enter the greater hot water phase (404). Given the process is intended to operate on a continual basis, the continuous influx of processed solids phase (401) will cool the hot water phase above the pinch point area (407) and substantially prevent vaporization of the diluent (420) in the inlet area, and therefore preventing the gaseous diluent (418) from exiting the flanged processed solids phase inlet (402) and moving back through the diluent washing process (not illustrated).

As the processed solids phase (401) enters the greater hot water phase (404), the processed solids phase will fall past the heating tube(s) (410), which are located nearer the cone-bottom (409) Wet Dryer design, allowing an opportunity for quality heat to evaporate the diluent phase (420), (further) liberating the hydrocarbon droplets (408) dissolved in the diluent, enabling them to float back to the top of the greater hot water phase for salvage at the flanged liquids outlet (415). Like FIG. 3, the heating tube of FIG. 4 is designed to deliver the hot water or steam through nozzles or outlets (411) which are spaced intermittently along the length of the delivery tube (410). The constant supply of steam or hot water (412) is delivered from the process heater (not illustrated) into a flanged inlet (419) of the heating tube(s) (410). The influx of hot water or steam also facilitates the replenishment of heat energy lost to diluent evaporation (420) and a constant tidal motion to move floating hydrocarbon droplets (408) and water containing higher chlorides (422) contamination to overflow from the Wet Dryer to fluids rehabilitation processes (113). As also demonstrated in the figure, 413 indicates the lid, 414 the flanged vapor outlet and 417 the solids phase settling in the tank.

The temperature of the hot water phase in the Wet Dryer is continually monitored by means of temperature probes (416) which are placed nearer the top and bottom of the greater hot water phase, and the injection of hot water or steam can be adjusted accordingly to increase, maintain or lower the greater hot water phase temperature.

A positive displacement pump (not illustrated) is connected to the flanged slurry outlet (421) to move the cleaned solids phase slurry to the solids dewatering process (111).

As mentioned above, there is a constant need to flush chlorides contaminated water and hydrocarbon droplets (which were dissolved in the diluent phase) from the Wet Dryer, so to keep the greater hot water phase chlorides contamination at a lower level than the incoming chlorides contamination of the processed solids phase. This permits the constant diffusion of chlorides from the solids to the greater hot water phase and thereby lowers the chlorides contamination of the solids, which could otherwise be detrimental to future reuse and recycling initiatives of the cleaned solids phase. Thus, it is expected that the injection of clean hot water (or steam) would occur nearer the bottom of the greater hot water phase, ideally nearest the processed solids phase as it moves through the Wet Dryer. This would create a greater hot water phase containing fewer chlorides ions nearest the processed solids phase, and a greater hot water phase with more chloride ions nearer the liquids phase outlet, which would enhance the chlorides diffusion capacity of the Wet Dryer.

If the residual chlorides value in the cleaned solids phase is still too high to support reuse and recycling efforts (following the Wet Dryer process), further water wash methods can be employed on the solids phase to obtain the desired cleanliness, either before or after the solids dewatering process (111). The recovered liquids phase from the solids dewatering process (119) is mixed with the liquids phase from the Wet Dryer overflow (113) and sent to a filtration bank, or centrifuge, or coalescing filter (114), all of which are commercially available technologies. The brine liquids (120) are then sent to the brine concentrator (118) which is employed to recover a portion of the water from the processes of FIG. 1 and recycled back to the process heater (117) for reuse.

It will be recognized that the brine concentrator can consist of flash kettles, or a distillation tower, or membrane filtration, or electrolysis, all of which are commercially available processes. Alternatively, the brine water can be disposed of in an environmentally acceptable manor, for example, a disposal well. Makeup water can be added back to the processes of FIG. 1, as needed.

When calculating the volume of clean hot water (or volumetric equivalent of steam after it has transitioned back to hot water) delivered to the Wet Dryer, the process designer must ensure an equivalent volume of water which was lost to the cleaned solids phase (112) during the dewatering process (111) is replenished to the Wet Dryer, as well as brine liquids lost to the brine solids disposition (115) or brine fluids resold (116), in order to maintain continued operation of the Wet Dryer process. To facilitate the required dilution rate of chlorides in the greater hot water phase it is expected that the ratio of the greater hot water phase volume will ideally be equal to the volume of solids processed over an hour, or as little as half the volume of the greater hot water phase, or as much as twice the volume of the greater hot water phase, compared to the volume of solids processed over a fixed period of time for example, one hour.

While the present invention describes removing a volatile diluent from a processed solids phase for example, washing a solid-soil matrix (in this case, drill cuttings) with a volatile diluent, it is to be understood that the invention can be used to remove a wide range of organic or inorganic contaminants from earthen materials using other hydrocarbon soluble diluents which boil at less than 100° C. for example hexane or ethyl acetate, or hydrocarbon soluble diluents which boil at less than 100° C. in an azeotrope with water for example, butanol or toluene.

As described herein, these problems and others in this area are addressed with the invention described herein. Thus, the scope of the invention shall include all modifications and variations that may fall within the scope of the attached claims. Other embodiments of the invention will be apparent to those knowledgeable from consideration of the specification and practice of the invention disclosed herein. It is intended that the specification and examples be considered as exemplary only, with a true scope and spirit of the invention being indicated by the following claims.

What is claimed is:

1. A process for removing diluent from processed solids containing a diluent comprising,
    introducing the processed solids containing diluent liquids phase into the inlet of a tank containing at least one inlet, at least one outlet, and a hot water phase at greater than 50° C. corrected to zero gauge pressure to cause the diluent liquids phase to evaporate and exit the hot water phase whereupon the evaporated diluent liquids vapor phase is evacuated through the at least one outlet of the hot water tank and,
    evacuating the evaporated diluent liquids vapor phase through the at least one outlet located above the hot water phase of the hot water tank, connected to a hermetically sealed conduit and condensing the evaporated diluent liquids vapor phase in an operatively connected condenser into at least one recovered condensed liquids phase and,
    recycling the recovered condensed liquids phase for reuse in at least one operatively connected gas tight diluent washing process and,
    evacuating the treated processed solids from the hot water tank and further dewatering the treated processed solids to remove at least a portion of the hot water phase resulting in a cleaned solids phase substantially lacking the diluent liquids phase,
    and wherein the entire process is performed in a vapor-tight and liquid-tight environment.
2. The process of claim 1 wherein the water temperature is below the boiling temperature of water, corrected to zero gauge pressure.
3. The process of claim 1 wherein the water temperature is greater than the boiling temperature of the diluent, corrected to zero gauge pressure.
4. The process of claim 3 wherein the diluent comprises hexane.
5. The process of claim 1 wherein the water temperature is greater than 60° C., corrected to zero gauge pressure.
6. The process of claim 1 wherein the water temperature is greater than 70° C., corrected to zero gauge pressure.
7. The process of claim 1 wherein the water temperature is greater than 80° C., corrected to zero gauge pressure.
8. The process of claim 1 wherein the water temperature is greater than 90° C., corrected to zero gauge pressure.
9. The process of claim 1 wherein the water temperature is less than 99° C., corrected to zero-gauge pressure.
10. The process of claim 1 wherein the water temperature is greater than the evaporation temperature of the diluent, corrected to zero gauge pressure.
11. The process of claim 1 wherein the evaporated diluent liquids phase additionally contains water vapor.
12. The process of claim 11 wherein the mixture of evaporated diluent liquids phase and water vapor comprises an azeotrope having a boiling point of less than 99° C., corrected to zero gauge pressure.
13. The process of claim 1 wherein the evaporated diluent liquids phase has a boiling point of less than 99° C., corrected to zero gauge pressure.
14. The process of claim 1 wherein the hot water tank is directly or indirectly heated with a process heater substantially powered by natural gas.
15. The process of claim 1 wherein the hot water tank is directly or indirectly heated with a boiler substantially powered by natural gas.
16. The process of claim 1 wherein the hot water tank is directly or indirectly heated with electric heaters.
17. The process of claim 1 wherein the vapor-tight and liquid-tight environment contains an oxygen content of less than 10% by volume.
18. The process of claim 1 wherein the cleaned solids phase contains chlorides and is further treated to reduce the chlorides content in the cleaned solids phase.
19. The process of claim 1 wherein the dewatering comprises processing the treated processed solids using one or more of a centrifuge, settling tank, and/or filter press.
20. The process of claim 1 wherein the ratio of the hot water phase volume to processed solids phase volume is about 1:2, 1:1, or 2:1.
21. A gas tight process for removing diluent from a processed solids phase by introducing the processed solids phase containing diluent phase into a tank containing a hot water phase at greater than 50° C. corrected to zero gauge pressure causing the diluent phase to evaporate and exit the hot water phase whereupon the diluent phase can be evacuated from the hot water tank and condense into at least one liquids phase, and simultaneously evacuating the processed solids phase from the hot water tank and further washing the processed solids phase in an operatively connected process to further remove organic or inorganic solids from the processed solids phase contained therein.
22. The method of claim 21 wherein the evaporation point of any evaporated diluent is less than the temperature of the hot water phase in the hot water tank.
23. A process for removing diluent from processed solids containing a diluent comprising,
    introducing the processed solids containing diluent liquids phase into the inlet of a tank containing at least one inlet, at least one outlet, and a hot water phase at greater than 50° C. corrected to zero gauge pressure to cause the diluent liquids phase to evaporate and exit the hot water phase whereupon the evaporated diluent liquids vapor phase is evacuated through the at least one outlet of the hot water tank and,
    evacuating the evaporated diluent liquids vapor phase through the at least one outlet located above the hot water phase of the hot water tank, connected to a hermetically sealed conduit and condensing the evaporated diluent liquids vapor phase in an operatively connected condenser into at least one recovered condensed liquids phase and, recycling the recovered condensed liquids phase for reuse in at least one operatively connected gas tight diluent washing process and, evacuating the treated processed solids from the hot water tank and further dewatering the treated processed solids to remove at least a portion of the hot water phase resulting in a cleaned solids phase substantially lacking the diluent liquids phase, wherein the entire process is performed in a vapor-tight and liquid-tight environment, and the processed solids are obtained from unstabilized drilling waste washed with volatile diluent.

24. A process for removing diluent from processed solids containing a diluent comprising, introducing the processed solids containing diluent liquids phase into the inlet of a tank containing at least one inlet, at least one outlet, and a hot water phase at greater than 50° C. corrected to zero gauge pressure to cause the diluent liquids phase to evaporate and exit the hot water phase whereupon the evaporated diluent liquids vapor phase is evacuated through the at least one outlet of the hot water tank and, evacuating the evaporated diluent liquids vapor phase through the at least one outlet located above the hot water phase of the hot water tank, connected to a hermetically sealed conduit and condensing the evaporated diluent liquids vapor phase in an operatively connected condenser into at least one recovered condensed liquids phase and, recycling the recovered condensed liquids phase for reuse in at least one operatively connected gas tight diluent washing process and, evacuating the treated processed solids from the hot water tank and further dewatering the treated processed solids to remove at least a portion of the hot water phase resulting in a cleaned solids phase substantially lacking the diluent liquids phase, wherein the entire process is performed in a vapor-tight and liquid-tight environment, and the processed solids are obtained from hydrocarbon contaminated solid-soil mixtures washed with a volatile diluent.

* * * * *

UNITED STATES PATENT AND TRADEMARK OFFICE
CERTIFICATE OF CORRECTION

PATENT NO. : 10,619,434 B2
APPLICATION NO. : 15/986243
DATED : April 14, 2020
INVENTOR(S) : S. Ross Page 1 of 1

It is certified that error appears in the above-identified patent and that said Letters Patent is hereby corrected as shown below:

On the Title Page

Item (60), please change "Jun. 1, 2007" to -- Jun. 1, 2017 --

Signed and Sealed this
Thirteenth Day of October, 2020

Andrei Iancu
*Director of the United States Patent and Trademark Office*